US008655352B2

(12) United States Patent
Marinov et al.

(10) Patent No.: US 8,655,352 B2
(45) Date of Patent: *Feb. 18, 2014

(54) SATELLITE TELEPHONY

(75) Inventors: Izhar Marinov, Givataym (IL); Gil Beniamini, Macabim (IL); Tzvika Meiri, Tel-Aviv (IL)

(73) Assignee: Gilat Satellite Networks Ltd., Petah Tikva (IL)

( * ) Notice: Subject to any disclaimer, the term of this patent is extended or adjusted under 35 U.S.C. 154(b) by 0 days.

This patent is subject to a terminal disclaimer.

(21) Appl. No.: 13/042,812

(22) Filed: Mar. 8, 2011

(65) Prior Publication Data

US 2011/0158158 A1 Jun. 30, 2011

Related U.S. Application Data

(63) Continuation of application No. 10/658,416, filed on Sep. 10, 2003, now Pat. No. 7,920,502.

(51) Int. Cl.
*H04W 4/00* (2009.01)
*H04W 72/00* (2009.01)

(52) U.S. Cl.
USPC .................................. 455/427; 455/452.1

(58) Field of Classification Search
USPC .................................. 455/12.1; 375/240.01
See application file for complete search history.

(56) References Cited

U.S. PATENT DOCUMENTS 5,839,068 A * 11/1998 Simmons .................. 455/427
6,473,858 B1 * 10/2002 Shimomura et al. ........ 713/150
6,757,264 B1 * 6/2004 Gayrard ....................... 370/316
6,813,271 B1 11/2004 Cable
2002/0061012 A1 * 5/2002 Thi et al. ..................... 370/352
2002/0131428 A1 9/2002 Pecus
2003/0097663 A1 5/2003 Puputti
2004/0110468 A1 6/2004 Periman
2004/0163129 A1 8/2004 Chapman et al.

FOREIGN PATENT DOCUMENTS

WO 0072469 11/2000

OTHER PUBLICATIONS

XP015011848 "Simple Encapsulation for transmission of IP datagrams over MPEG-2/DVB networks", May 2003, Internet Engineering Task Force, Horst D. Clausen et al.
Office Action issued in European Application No. 04 254 522.8-1225, dated Nov. 22, 2011.
Digital Video Broadcasting (DVB); Framing Structure, Channel Coding and Modulation for 11/12 GHz Satellite Services; European Telecommunications Institute; EN 300 421; V1.1.2 (Aug. 1998); pp. 10, 11 and 12.
European Search Report dated Oct. 19, 2004.
ATSC Data Broadcast Standard A/90; ATSC Committee, Jul. 26, 2000 XP002208294.
"Architecture," website, http://www.proitus.com/Satellite.asp, pp. 1-7 printout of Aug. 12, 2003.

(Continued)

*Primary Examiner* — Michael Faragalla
(74) *Attorney, Agent, or Firm* — Banner & Witcoff, Ltd.

(57) ABSTRACT

Embodiments of the present invention relate generally to packetization techniques for satellite transmission of data, such as telephony data. Some embodiments use the MPEG2 standard in connection with the ETSI DVB data piping profile for arranging the data. Embodiments also relate to method for receiving, demultiplexing and managing incoming telephony data to support a variety of telephony applications including voice, facsimile, Internet and other data.

22 Claims, 7 Drawing Sheets

(56) References Cited

OTHER PUBLICATIONS

"Broadband Satellite Solutions," website, Nera Telecommunications, Ltd., http://www.neratel.com.sg/satellite/DVB-RCS.html, pp. 1-2, printout of Aug. 12, 2003.

"Apertura Satellite System Applications," website, Australian Private Networks Pty Ltd, http://www.apertura.com.au/satellite/applicaitons.html, pp. 1-3, printout of Aug. 12, 2003.

"Satellite Coverage," website, State Wireless, http://www.statewirelss.com/satellite_services.html, pp. 1-10, printout Aug. 12, 2003.

* cited by examiner

Fig. 1

| Byte | 7 (MSB) | 6 | 5 | 4 | 3 | 2 | 1 | 0 (LSB) |
|---|---|---|---|---|---|---|---|---|
| 1 | 301 Synchronization ||||||||
| 2 | 302 Transport Error | 303 Payload Unit Start | 304 Transport Priority | 305 Packet ID [12 ... 8] |||||
| 3 | 306 Packet ID [7 ... 0] ||||||||
| 4 | 307 Transport Scrambling Control || 308 Adaptation Field Control || 309 Continuity Counter ||||
| 5-188 | 310 Payload ||||||||

| Byte | 7 (MSB) | 6 | 5 | 4 | 3 | 2 | 1 | 0 (LSB) |
|---|---|---|---|---|---|---|---|---|
| 0 | 401 Telephony Code | | | | | | | |
| 1 | 402 Frame Counter | | | | | | | |
| 2 | 403 Call #1 VSAT ID [15 ... 8] | | | | | | | |
| 3 | 404 Call #1 VSAT ID [7 ... 0] | | | | | | | |
| 4 | 405 Call #2 VSAT ID [15 ... 8] | | | | | | | |
| 5 | 406 Call #2 VSAT ID [7 ... 0] | | | | | | | |
| 6 | 407 Call #3 VSAT ID [15 ... 8] | | | | | | | |
| 7 | 408 Call #3 VSAT ID [7 ... 0] | | | | | | | |
| 8 | 409 Pointer to Frame for Call #2 | | | | | | | |
| 9 | 410 Pointer to Frame for Call #3 | | | | | | | |
| 10-67 | 411 Frame Call #1 | | | | | | | |
| 68-125 | 412 Frame Call #2 | | | | | | | |
| 126-183 | 413 Frame Call #3 | | | | | | | |

SATELLITE TELEPHONY

RELATED APPLICATIONS

This application is a continuation of non-provisional application Ser. No. 10/658,416, filed Sep. 10, 2003, and entitled "Improved Satellite Telephony," the contents of which are incorporated herein by reference in its entirety for all purposes.

FIELD OF THE INVENTION

The present invention relates generally to the field of satellite communications. Some embodiments relate to packeting schemes for encapsulating data in digital transmission. Some embodiments use a packet scheme in accordance with the Moving Picture Experts Group (MPEG)-2 transmission standard, as used in a satellite transmission system employing the Digital Video Broadcast (DVB) standard established by the European Telecommunications Standards Institute (ETSI).

BACKGROUND OF THE INVENTION

In October, 1957, a twenty-three inch diameter metal ball made history. Named Sputnik 1, it was the first communication satellite successfully launched into orbit of the Earth. Sputnik was the first, but by far was not the last. In the decades since then, thousands of satellites have been launched, and they have grown to become a critical and reliable aspect of our society. Today, they are used to enable rapid distribution of newspaper content, television services, global positioning information, radio stations, and countless other types of information.

One of the more prominent uses of satellites today is in the transmission of television programming and content in a digital format. Customers may purchase individual satellite dishes to subscribe to any of a number of these satellite digital television services. The present discussion relates to several technical standards that are used to enable such services. The first such standard deals specifically with satellite transmission, was established by the European Telecommunications Standards Institute (ETSI), and is known as DVB-S. The DVB-S standard focuses on satellite transmission of digital video data, and employs another digital standard, known as MPEG2, for the compression and packetization of the digital data carried by DVB-S transmissions. The DVB-S standard is actually a part of a family of standards established by ETSI, known generally as DVB, that are used for the transmission of video, audio and other data using the MPEG2 standard over a satellite. A similar DVB standard, known as DVB-T, is used for transmission over terrestrial links.

The MPEG2 standard, established by the Moving Pictures Experts Group, relates generally to the compression and packetization of digital data. Originally developed for use in transmitting digital video and audio data, the MPEG2 standard has also been used to transmit data by placing data packets (also known as datagrams) within the payload sections of one or more MPEG2 packets, which are transported as MPEG2 transport stream(s) according to the DVB-S standard. The part of the DVB standard that defines the transmission of data protocols over a DVB carrier is called Multi Protocol Encapsulation (MPE). This option can be used to transmit IP (Internet Protocol) packets thus allowing satellite-based connectivity to the Internet. As an extension to this possibility, it is also possible to use this satellite transmission to enable voice over IP (VoIP) telephony applications.

Such satellite-based telephone applications are advantageous, in that they allow telephone service and communications for remote locations in the world, or areas that lack the infrastructure for wired communications.

Using the DVB-S standard to carry voice over IP allows cheaper systems to be manufactured, since much of the DVB-S and IP-based equipment is already in use for other Internet purposes, and the economy of scale drives prices downward. There are problems, however, with such satellite telephone solutions. Namely, using the DVB-S and IP protocols requires significant overhead.

For example, in a typical voice over IP system, voice data is compressed into voice packets that are 24 bytes long. Each such voice packet carries the information for 30 milliseconds of voice data. To help reduce overhead, a technique called "packing" is often used to place two voice packets within a single MPEG2 packet bound for a single destination. Since each voice packet carries 30 milliseconds of data, carrying two voice packets in each MPEG2 packet would mean that each MPEG2 packet must be processed once every 60 milliseconds, or else a perceivable delay will result in the audio.

This "packing" of pairs of voice packets reduces some overhead, but much overhead remains. The IP protocol requires 20 bytes of overhead to contain the necessary IP routing and addressing information associated with the two 24-byte voice packets. Transmitting these voice packets requires another 12 bytes per transmission for the Real Time Transport Protocol (RTP), as well as another 8 bytes for the User Datagram Protocol (UDP). Accordingly, to transmit 48 bytes of actual data (the two 24-byte packets), there is a corresponding additional 40 bytes of overhead.

Typically, the MPE format is used to encapsulate IP datagrams for transmission using the DVB format. This MPE encapsulation adds a-12 byte header (including, among other, the MAC address and length) and a 4-byte Cyclic Redundancy Check (CRC) for error detection. Therefore, 16 bytes are added to each IP datagram to be sent over DVB using MPE encapsulation. The total overhead is determined by the length of the IP datagram, if a single datagram is encapsulated in an MPEG2 packet then we get 16 bytes for the MPE encapsulation header. Since each MPEG2 packet has a fixed length of 188 bytes, then if small datagrams are to be sent, then multiple datagrams can be packed in a single MPEG2 packet, this is called packing. When packing is used the MPE overheads are 16 bytes per packet. Very large datagrams are split into multiple MPEG2 packets, but the MPE overhead is still 16 bytes. Therefore the MPE encapsulation scheme is efficient for large IP datagrams. However for telephony applications, where the datagrams are very small (48 bytes), the MPE is not very efficient.

Totaling these figures, to transmit 48 bytes of data in existing satellite-based voice-over-IP systems, an additional 56 bytes of overhead is required. This overhead consumes the transmission capacity of a satellite, reducing the amount of actual voice data that it can transmit at any one time. There is a need to reduce this overhead, and maximize the effective use of a satellite's transmission capability to provide telephony services.

BRIEF SUMMARY OF THE INVENTION

The following presents a simplified summary of aspects of the invention. This summary is not an extensive overview of the entire invention. It is not intended to identify key or critical elements of the invention or to delineate the scope of the invention. The following summary merely presents some concepts in a simplified form as a prelude to the more detailed description provided below.

To overcome at least some of the limitations in the prior art described above, and to overcome other limitations that will be apparent upon reading and understanding the present specification, the present invention is directed to a novel method of handling data for transmission.

A first aspect of some embodiments of the invention provides a number of packeting schemes that avoids much of the overhead currently associated with satellite telephony systems by applying the schemes to the DVB data piping profile. The DVB data piping profile requires minimal overhead, and makes no assumptions regarding the format of the data being sent. Some embodiments of the present invention take advantage of this piping profile to transmit voice data in the MPEG2 stream format.

A second aspect uses existing MPEG2 packet structures in a novel manner to transmit telephony data with a minimum of required overhead. For example, some embodiments divide the payload portion of an MPEG2 packet to carry a number of frame packets or messages intended for a plurality of receiving terminals, such as a voice packet.

A third aspect relates to identifying telephony frame data that has been placed within an MPEG2 packet. In some further aspects, a payload unit start bit is used in combination with a pointer having a predetermined value indicative of telephony data. In other further aspects, a specific MPEG2 Packet Identifier (PID) is used to indicate the presence of telephony data in the packet.

A fourth aspect relates to receiving and demultiplexing data that has been transmitted in a format as specified herein.

BRIEF DESCRIPTION OF THE DRAWINGS

A more complete understanding of the present invention and the advantages thereof may be acquired by referring to the following description in consideration of the accompanying drawings, in which like reference numbers indicate like features, and wherein.

DETAILED DESCRIPTION OF ILLUSTRATIVE EMBODIMENTS

In the following description of the various embodiments, reference is made to the accompanying drawings, which form a part hereof, and in which is shown by way of illustration various embodiments in which the invention may be practiced. It is to be understood that other embodiments may be utilized and structural and functional modifications may be made without departing from the scope of the present invention.

Figure 1:
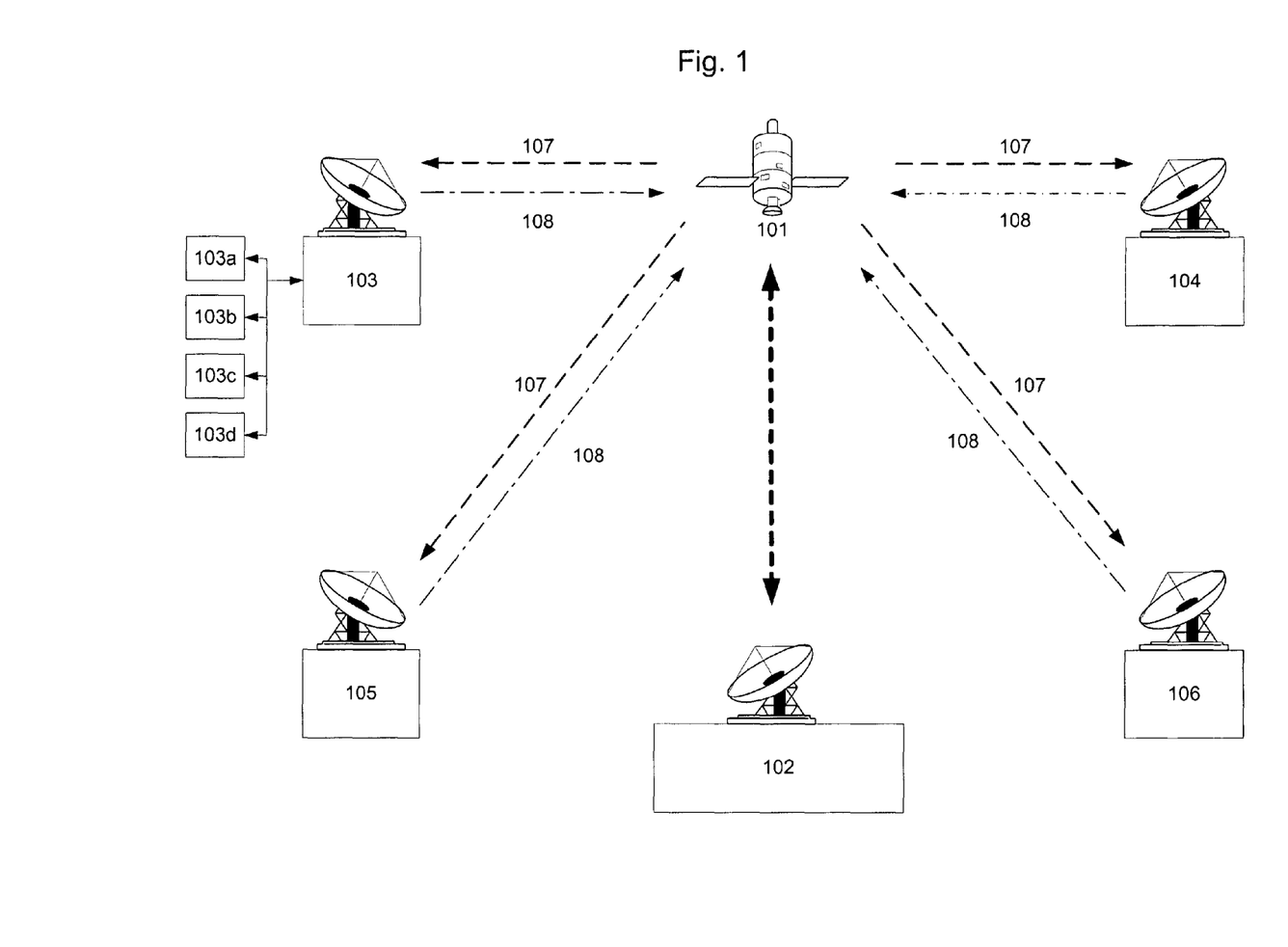
FIG. 1 illustrates an example satellite communication system in which one or more embodiments of the present invention may be implemented.

FIG. 1 illustrates an example configuration in which one or more embodiments of the present invention may be practiced. In the FIG. 1 configuration, sometimes referred to as a "star" configuration, a communication satellite 101 may orbit the earth and communicate with a hub 102. Hub 102 may serve as the center of a network, and may have one or more computer servers, terminals, or other computing devices associated therein. Satellite 101 may also communicate with one or more other terminals 103-106, which may be Very Small Aperture Terminals (VSATs). Terminals 103-106 may include an antenna or radar dish for communicating with satellite 101, and may also communicate with one or more additional peripherals 103a-d. These peripherals may include any type of computing device, such as one or more personal computers, set-top boxes, personal video recorders, televisions, telephones, facsimile machines, alarm systems, etc. Terminals 103-106 may in turn serve as servers for sub-networks of such computing devices, and may also communicate with other satellites (not shown).

In some embodiments, satellite 101 facilitates communications between hub 102 and terminals 103-106 in several ways. For communications from the hub 102 to terminals 103-106, also known as the "outbound channel," the hub 102 may transmit signals to satellite 101, which may then be "bounced" back down as a broadcast signal 107 that is received by a plurality of the terminals 103-106. In such a system, each terminal is responsible for determining whether any of the data received in the broadcast signal 107 is intended for that terminal. For communications from terminals 103-106 to the hub 102, also known as the "inbound channels," each terminal 103-106 may send its own transmission 108, which may then be forwarded back to the hub 102. In some embodiments, transmission 108 can also be used by the terminals to communicate with other terminals (e.g., mesh transmission). In some embodiments, these transmissions 108 are in the same format as one another, and may also be in the same format as the outbound channel 107. In other embodiments, these inbound channel transmissions 108 may be in different formats to allow for compatibility with different transmission equipment. In some embodiments, the inbound channel transmissions 108 are transmitted in bursts, and not continuously, to conserve bandwidth. In yet other embodiments, the inbound channel transmissions 108 may be transmitted continuously to, for example, help ensure a continuous inbound communication session. In still further embodiments, the inbound channels 108 may be used in both a burst mode and a continuous mode depending upon the particular needs of terminals 103-106.

Figure 2:
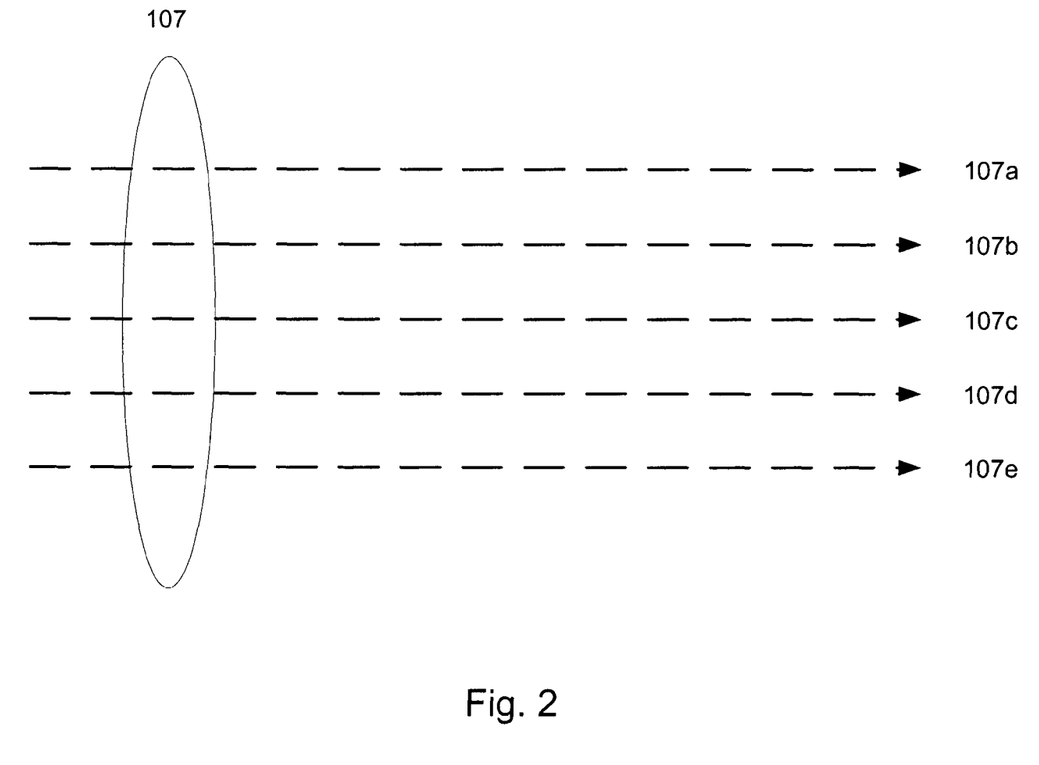
FIG. 2 illustrates a logical diagram of the data streams found in the MPEG2 standard used with some embodiments disclosed herein.

In some embodiments, the outbound channel 107 is implemented according to the DVB-S standard. In this standard, the channel 107 transmits data in MPEG2 packetized form, and includes a number of logical links 107a-e, also known as MPEG transport streams. FIG. 2 illustrates this concept. Each MPEG2 transport stream 107a-e is assigned a unique PID, which in some embodiments is a thirteen-bit code. Packets containing data for a particular stream 107a-e may include that stream's PID in the packet's header. A receiver (e.g., in a terminal 103-106, the satellite 101, and/or hub 102) configured to receive such MPEG2 packets may be provided with information identifying the various streams containing data relevant to that receiver, and can use the PID to determine whether a received packet is to be kept. The various streams may be used to carry distinct data transmissions, such as the separate audio and video components of a television broadcast, Internet data, etc.

Figure 3:
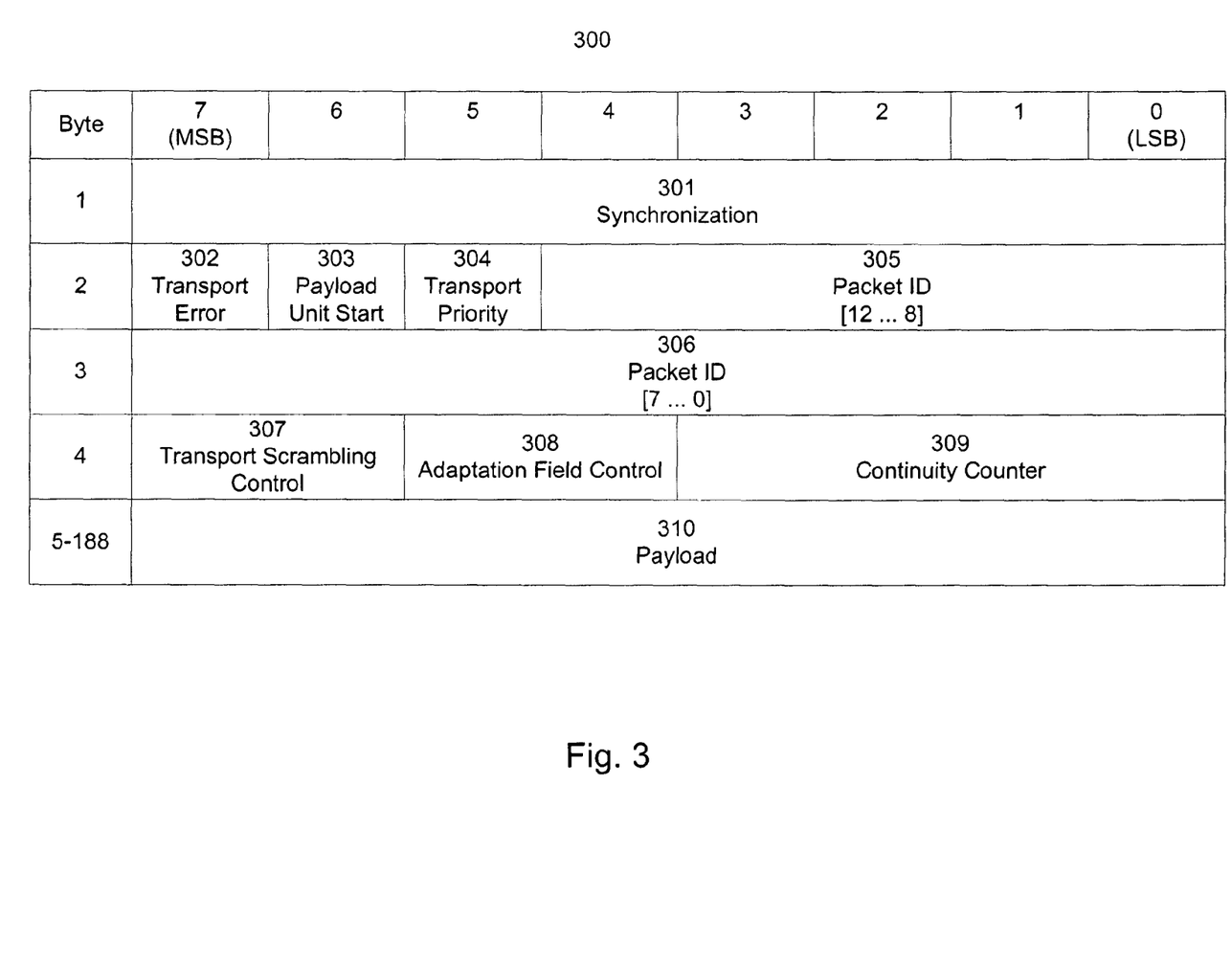
FIG. 3 illustrates a typical MPEG2 packet structure.

FIG. 3 illustrates a basic MPEG2 packet format that may be used for many embodiments of the present invention. As defined by the MPEG2 standard, an MPEG2 packet 300 includes 188 bytes of information, where each byte contains eight (8) bits (each bit is a '1' or '0') of data. The table in FIG. 3 identifies the 188 bytes down the left side, with the eight bits of each byte identified across the top numbered 7 (most significant bit) to 0 (least significant bit).

The first four bytes are the packet's header, and generally contain information used by the receiver under the MPEG2 protocol to identify the information contained in the packet and how it should be handled. For example, Synchronization byte 301 contains synchronization data that is a predefined pattern to allow an MPEG2 receiver to recognize when it has begun to receive an MPEG2 packet. The next header byte contains several pieces of information. Transport Error bit 302 identifies whether the current packet is believed to contain potentially corrupted data or an uncorrected error. Payload Unit Start bit 303 identifies whether the data contained in the payload portion 310 of the packet is the beginning of whatever data or file is being transmitted. For example, if a data file is too large to fit in a single MPEG2 packet, it may be sent piecemeal in a number of packets. For the first of these packets, the Payload Unit Start Bit 303 will be set. For the rest of these packets, the Payload Unit Start Bit 303 will not be set.

After a Transport Priority bit 304, the next five bits 305, together with the third byte 306, contain the thirteen-bit PID identifying the logical link 107*a-e*, or transport stream, to which the current packet belongs. The first two bits 307 of byte 4 are the Transport Scrambling Control bits. These will identify the type of scrambling, if any, that has been applied to the data carried in the current packet. The next two bits, Adaptation Field Control bits 308, indicate that the current packet carries additional header information in its Payload 310 (discussed below). The next four bits, Continuity Counter 309, are used to identify the current packet's place in a sequence of packets so that the original data, which may have been sent in pieces, are reassembled in their correct order. The last 184 bytes of the MPEG2 packet are its Payload 310. The contents of Payload 310 are the data that is being transmitted.

In one embodiment, the MPEG2 packet is used to carry telephony data. Telephony (or telephone) data, as used herein, refers generally to any and all types of information that can be carried by telephone link, including but not limited to audio, video, facsimile, computer and Internet data. In some embodiments, this telephony data is transmitted according to the DVB data piping profile set forth in standard ETSI EN 301 192. In the DVB data piping profile, information is formatted as MPEG2 packets and transferred directly onto an MPEG2 transport stream for transmission according to the DVB standard.

Since MPEG2 packets carry 184 bytes of data in their payload, and many data files exceed 184 bytes in length, it is common to require multiple MPEG2 packets to transmit a single IP datagram. To accommodate these transmissions, the MPE encapsulation standard provides two different types of packets. The first type, known as "first ones," contains data that begins an IP datagram. The second type, known as "continues," contains data that does not begin a datagram's data. Thus, for example, if a particular datagram requires 10 MPEG2 packets for transmission, the datagram's data will be broken down into 10 separate MPEG2 packets. The first such packet is a "first one," while the remaining nine are "continues."

According to the MPE standard, the Payload Unit Start bit 303 identifies whether a given packet is a "first one" or a "continue." If the bit is set, then the packet is a "first one." In a "first one" packet, and according to the MPE standard, the first byte of the Payload 310 is expected to contain a pointer to a location within the Payload 310 where the first byte of data of a second payload may be found. Such a pointer allows the splitting of long datagrams into several MPEG2 packets, and packing of several short datagrams into a single MPEG2 packet.

Since the Payload 310 is 184 bytes long, this pointer is naturally not expected to point to a location beyond the 184-byte Payload 310 portion of the packet. There are a number of ways to implement such pointers. For example, a zero offset pointer identifies a location that is a number of bytes from the first byte of the payload. Thus, a zero offset pointer value of 1 would point to the byte that is one byte from the first byte (i.e., the second byte); while a zero offset pointer value of 3 would point to the byte that is three bytes from the first byte (i.e., the fourth byte). Other pointer conventions are also possible, such as a pointer that counts its offset not from the first byte of the payload, but from the first byte of the entire MPEG2 packet.

Some embodiments of the present invention take advantage of this convention by assigning meaning to pointer values that point to locations outside of the MPEG2 Payload 310. In one embodiment, the Payload 310 first byte is set to 0xC0 (decimal 292) to indicate the presence of telephony data. Other embodiments may use any value that points to a location outside of the Payload 310 portion of the packet, such as 0xD0 (decimal 293), 0xB9 (decimal 185), etc. In some alternative embodiments, setting the highest two bits of the first byte are all that is necessary to define an address location outside of the Payload 310 portion (since setting these bits means a minimum of decimal 292), and the remaining six bits may be put to other use.

Figure 4:
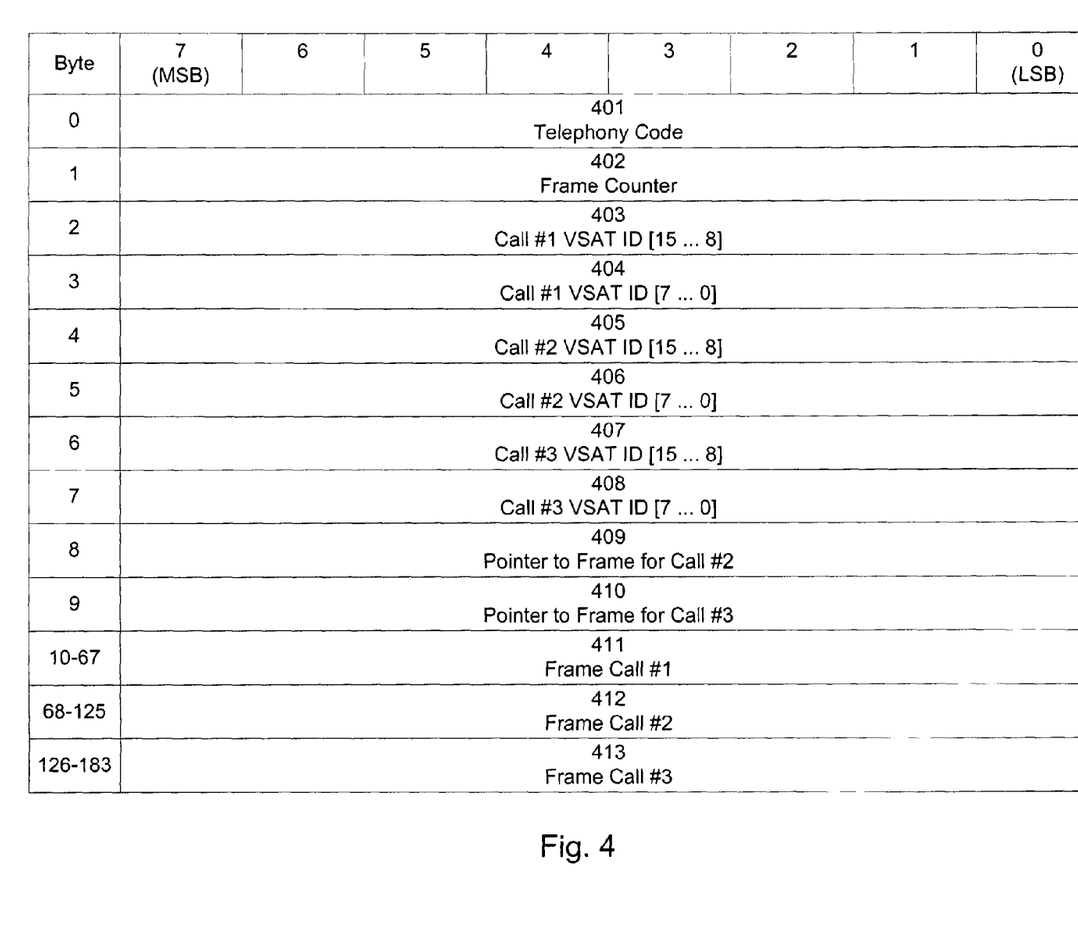
FIG. 4 illustrates a packet payload arrangement that may be used in some embodiments of the present invention to carry telephony data.

FIG. 4 illustrates a Payload 310 organization according to one example embodiment of the present invention. In the FIG. 4 embodiment, the first byte in the Payload 310 is a Telephony Code 401 that is set to a predetermined value to signify that the packet contains telephony data. As discussed above, the FIG. 4 embodiment uses 0xC0 for this predetermined value, but any other predetermined value may be used.

The next byte, Frame Counter 402, identifies the number of telephony "frames," or messages, that are included in the present packet. A "frame" refers to an amount of telephony data, such as voice data. The FIG. 4 embodiment includes three frames of data per packet Payload 310, so packets arranged in this embodiment would have a Frame Counter 402 value of three. If more or fewer frames are included in the packet, the Frame Counter 402 will reflect the number of frames.

For each frame contained in the MPEG2 packet, there may be a two-byte VSAT Identification (ID) value. The VSAT ID is a code used in satellite systems (such as the one shown in FIG. 1) that can uniquely identify a particular terminal receiving the satellite 101 signal. If Frame Counter 402 is (n), the FIG. 4 embodiment includes (2n) bytes containing the VSAT IDs corresponding to the (n) frames. In the FIG. 4 embodiment, three frames are included in the MPEG2 packet, and as such, six bytes of VSAT ID information are included. The first two bytes 403-404 identify the VSAT ID for the first frame, the second pair of bytes 405-406 identifies the VSAT ID for the second frame, and the third pair 407-408 identifies the VSAT ID for the third frame.

Byte 409 contains a pointer to the location in the Payload 310 where the second frame begins, while byte 410 contains a pointer to the location in the Payload 310 where the third frame begins. In some embodiments, the value of this pointer represents the distance (in bytes) from the first Payload 310 byte (Telephony Code 401) to the beginning of the frame.

Frame 411 contains the data for the first frame in the packet. In the FIG. 4 embodiment, the frames are 58 bytes long (bytes 10-67), each carrying two 24-byte packets of voice data compressed according to the ITU G.723.1 standard, and an additional 10-byte header for the frame. The additional 10-byte frame header may be used by the receiver to determine which peripheral (e.g., 103*a-d*) should receive the frame of data, identify the type of payload (e.g., compressed in G.723.1 format, facsimile, etc.), and it may include a port identifier and/or call identifier, or any other additional information useful to the system. This frame header need not be 10 bytes long, and may be of a different length if desired. Frames 412 and 413 are the remaining two 58-byte frames carried in the packet, and can carry telephony data for two other peripherals (or even peripherals connected to different terminals 103-106).

Using the FIG. 4 embodiment, a communication system may transmit data for a number of communication sessions, such as telephone calls, facsimile transmissions, Internet sessions, etc. for a number of peripherals associated with a receiver such as terminals 103-106 in an efficient manner.

The FIG. 4 embodiment is merely one example byte structure, and a number of variations are possible. For example, the bytes (e.g., the frames 411-413, VSAT IDs 403-408 and number of frames 402) need not be arranged as they are shown in FIG. 4, and may instead be arranged in any other desired order.

The FIG. 4 embodiment uses a combination of the Payload Unit Start bit 303 and the telephony code 401 to indicate to the receiver that the MPEG2 packet contains telephony data. Alternative methods of such indications are also possible. For example, the system may assign a particular PID (found in the MPEG2 header 300) to all packets containing telephony data, and receivers (e.g., in terminals 103-106, satellite 101, and/or hub 102) can simply check the PID in received MPEG2 packets to determine whether that MPEG2 packet contains telephony data. A potential advantage to this is that the telephony code 401 may no longer be needed, freeing up that byte in the packet for transmission of data. This also avoids the need for using the Payload Unit Start bit 303 for indicating the presence of telephony data—something that is not its intended use in the MPEG2 standard, and which may present difficulties to other applications that assume the Payload Unit Start bit 303 is only set when a new data file begins.

The FIG. 4 embodiment uses a 16-bit VSAT ID, which is enough to uniquely identify up to 65,536 VSATs. For networks having fewer VSATs, a shorter VSAT ID may be used. Conversely, larger networks may use a longer VSAT ID. The particular length may be chosen based on the anticipated network size, and is not limited to the 16-bit length shown in FIG. 4. Similarly, the size of other data shown in FIG. 4 may be varied as well. For example, Frame Counter 402, pointer 409 and/or pointer 410 may be smaller than a single byte, depending on the desires of the designer.

As a further alternative, the pointers at bytes 408 and 409 may be eliminated. If the size of the payload is known and fixed, then in such alternative embodiments, the locations for frames 412 and 413 may simply be calculated based on the lengths of the other data in the packet, and the number of frames contained in the packet. For example, frames 412 and 413 may begin sequentially, immediately after frame 411. Additionally, frame 411 may begin immediately after the various VSAT IDs 403-408.

The MPEG2 standard defines the 184-byte payload size, but the number of frames contained within this payload may be modified. Among the factors that may be considered in determining the size and number of frames to include in a packet are: 1) the type of information being carried; and 2) the acceptable level of service. As noted above, voice compression according to the ITU G.723.1 standard results in a 24-byte packet of voice data that corresponds to 30 milliseconds of audio. The consequence of such compression is a 30 millisecond delay (at least) between the time the speaker makes the sound and the time the 30-millisecond portion is compressed and transmitted. If a 60 millisecond delay is acceptable, then the MPEG2 packets may carry two of these compressed-voice packets at a time for any given call or communication session. Since the MPEG2 packet shown in FIG. 4 carries three such frames, that packet can carry data for three different devices.

The FIG. 4 embodiment accepts this 60-millisecond delay, and its frames include two 24-byte compressed voice packets, using 48 bytes. Each frame also includes its own 10-byte header that identifies the particular call, conversation, communication session and/or peripheral device that is to receive the voice packets. As noted above, this 10-byte frame header may be of a different size if desired. If a greater delay is acceptable, such as in the case of some types of non-voice data, then the frame size may be increased to include more information with each frame, thereby increasing efficiency by reducing overall overhead, and the MPEG2 packet might carry fewer than three frames. In some embodiments, each MPEG2 packet may simply carry a single voice frame, avoiding some overhead (such as pointers 409, 410). On the other hand, if a shorter delay is desired, the frames may be reduced in size, such that they each only carry one 24-byte packet of information. Such a shorter frame may also allow a greater number of simultaneous calls, as each MPEG2 packet would be able to carry more frames at one time, although the header attached to these frames would increase the overall overhead.

The FIG. 4 embodiment uses the ITU G.723.1 standard for compressing voice telephone data. However, other compression standards may be used instead, and other types of data may be transmitted. The use of different standards and compression format may allow greater or fewer numbers of frames to be included with each packet, depending on factors such as the two identified above. Other types of data, or other delay criteria, may result in different numbers and/or sizes of frames. For example, a facsimile transmission may permit larger frames due to the absence of the voice compression packet size and/or the greater acceptability of delay. Other types of voice compression may result in packets of different size. For example, a low voice rate (e.g., 2.5 kbps) may allow a greater number of smaller frames to be placed within a single MPEG2 packet, while higher rate voice data (e.g., 8 or 16 kbps) may result in larger frames. Accordingly, although the FIG. 4 example uses three frames per packet, it will be understood that any other number of frames may be placed in the packet, subject to the various considerations discussed herein and the overall payload limit size of 184 bytes.

Figure 5:
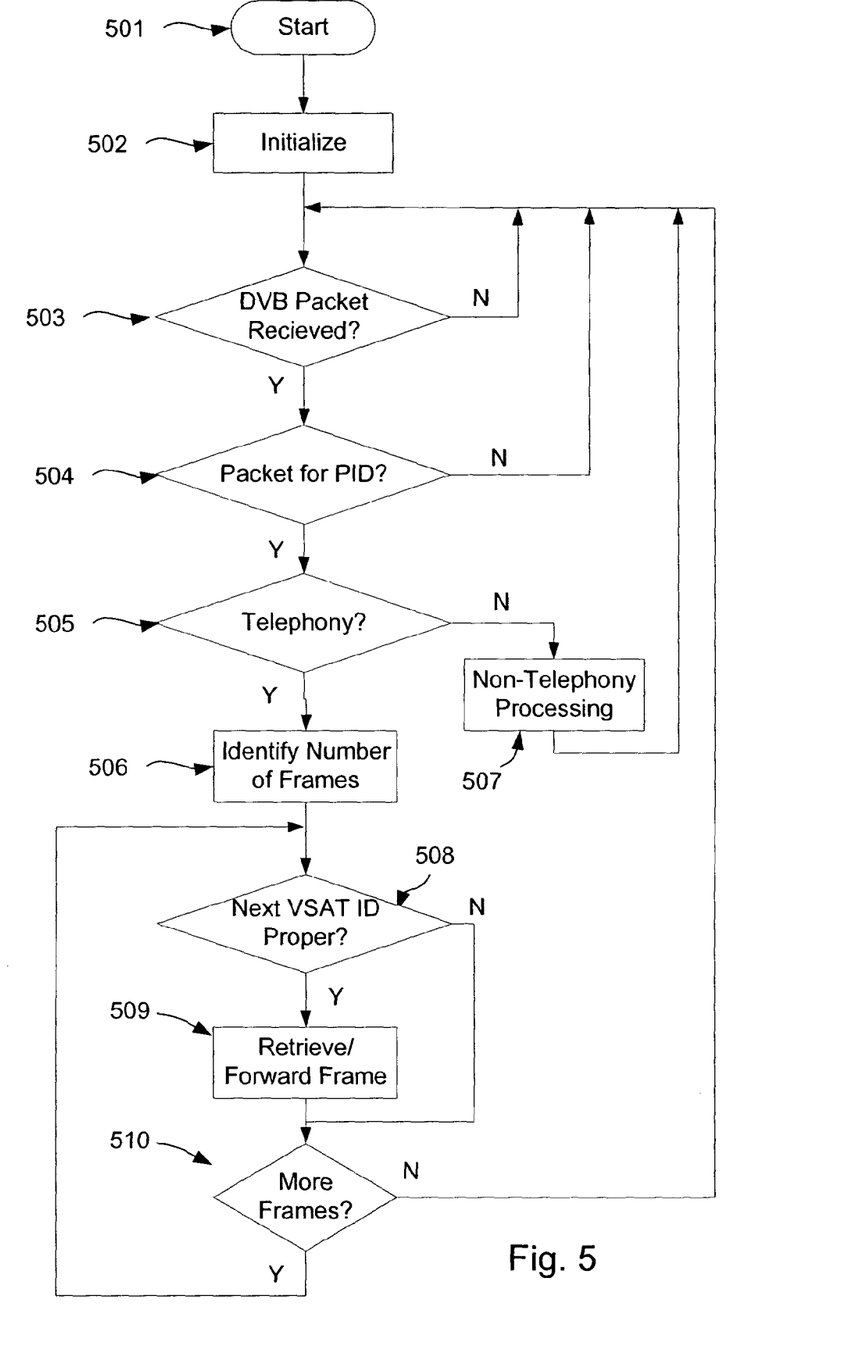
FIG. 5 illustrates an example flow diagram for a process of receiving and handling packets according to some embodiments of the present invention.

FIG. 5 illustrates an example logical flow diagram employed at a receiver (e.g., in terminals 102-106, satellite 101, and/or hub 102) in some embodiments of the present invention. After beginning the process 501, an initialization 502 is needed to prepare for the receipt of incoming packets. During this initialization 502, the receiver determines the format of the packets that are expected to be received, identifies the MPEG2 logical data streams (and their corresponding PIDs) that are expected to carry data of relevance to the receiver, and identifies the VSAT ID(s) that correspond to the receiver. As noted above, a VSAT ID may uniquely identify a given receiver, and the receiver may be prepared to receive packets addressed to its own VSAT ID. Certain VSAT ID codes may also be set aside for identifying predefined groups or types of receivers. For example, a certain VSAT ID may be assigned to all terminals 103-106, and frames addressed to that VSAT ID will be intended for all terminals. As another example, a different VSAT ID may be assigned to all terminals 103-106 within a given location, or of a given type. The use of such generic VSAT IDs allows for the broadcast transmission of data, such that the data may be addressed to a plurality of receivers.

Initialization 502 is shown in FIG. 5 as a single step, but the various initialization and setup activities that are necessary need not be performed simultaneously or in a single step. In the FIG. 5 embodiment, the initialization may be performed prior to processing packets containing telephony data. In some embodiments, some or all of the initialization may be repeated after some packets have already been processed. This may occur, for example, when there is a change in the VSAT IDs to be used, or to dynamically reconfigure the distribution of frames within the MPEG2 packets.

The process then moves to step 503, in which a received packet is checked to see whether it has been formatted according to the DVB format. If the packet is not a DVB format, then the process waits until a DVB format packet has been received.

If a DVB packet has been received, the packet's PID is obtained from the packet header and compared in step 504 to the PID(s) identified during initialization to determine whether the received packet carries a data stream of relevance to the receiver. For example, a terminal 103 may be preconfigured to accept only data packets containing certain PIDs. Some embodiments may ignore packets whose PIDs relate to other forms of data, such as management, IP data or synchronization.

If the packet is of relevance to the receiver (e.g., its PID identifies a logical stream that the receiver wishes to receive), the system determines in step 505 whether the packet contains telephony data that is arranged, or encapsulated, according to an embodiment of the present invention (such as voice data as stated in FIG. 5). In most embodiments, the received packet does not contain data that is arranged according to the Internet Protocol (e.g., an IP packet such as those used at the present), and as such avoid the excessive overhead associated with IP packets. For packets configured according to the FIG. 4 embodiment, this step may involve determining whether Payload Unit Start bit 303 is set and, if so, whether the Telephony Code 401 byte is 0xC0. Alternatively, this step may involve determining whether the Telephony Code byte 401 exceeds a certain value (such as 183, the size of the MPEG2 payload), or whether the highest two bits of Telephony Code byte 401 are high. Any number of alternative designs may be used to indicate the presence of telephony data.

If the packet does not contain telephony data, then the process proceeds to step 507, where the packet contents are processed as non-telephony data. This processing will depend on the type of data contained in the packet, and the necessary processing. For example, if the packet contained a video segment of a television program, and was not encapsulated in accordance with an embodiment of the present invention, that video segment may be processed by a video processor for display on a user's television set as is normally done with digital video.

If the system determines that the packet contains telephony data encapsulated in accordance with an embodiment of the present invention, the system proceeds to step 506 to determine the number of frames contained in the MPEG2 packet. In the FIG. 4 embodiment, this can be accomplished by reading Frame Counter 402.

The process then proceeds to step 508, where the VSAT ID corresponding to the next frame is retrieved from the packet, and compared against the VSAT IDs that were identified during Initialization 502 as being relevant to the receiver. If the VSAT ID is proper, or corresponds to a VSAT ID assigned to the receiver, then the process moves to step 509. In step 509, the frame is retrieved from the packet, and forwarded by the receiver to the appropriate device or peripheral (e.g., 103a-d) for further processing. The receiver can examine the frame header (e.g., the 10-byte header in first frame 411) to determine where it should send the frame and/or what it should do with the frame.

The process then moves to step 510 to determine whether more frames of data are found in the current packet. Step 510 is also performed if, in step 508, the next VSAT ID does not correspond to any of the VSAT IDs of relevance to the receiver.

In step 510, if more frames are in the packet, the process returns to step 508 to examine the next frame's VSAT ID. If no more frames are in the packet, then the process returns to step 503 to await receipt of the next DVB packet.

Figure 6:
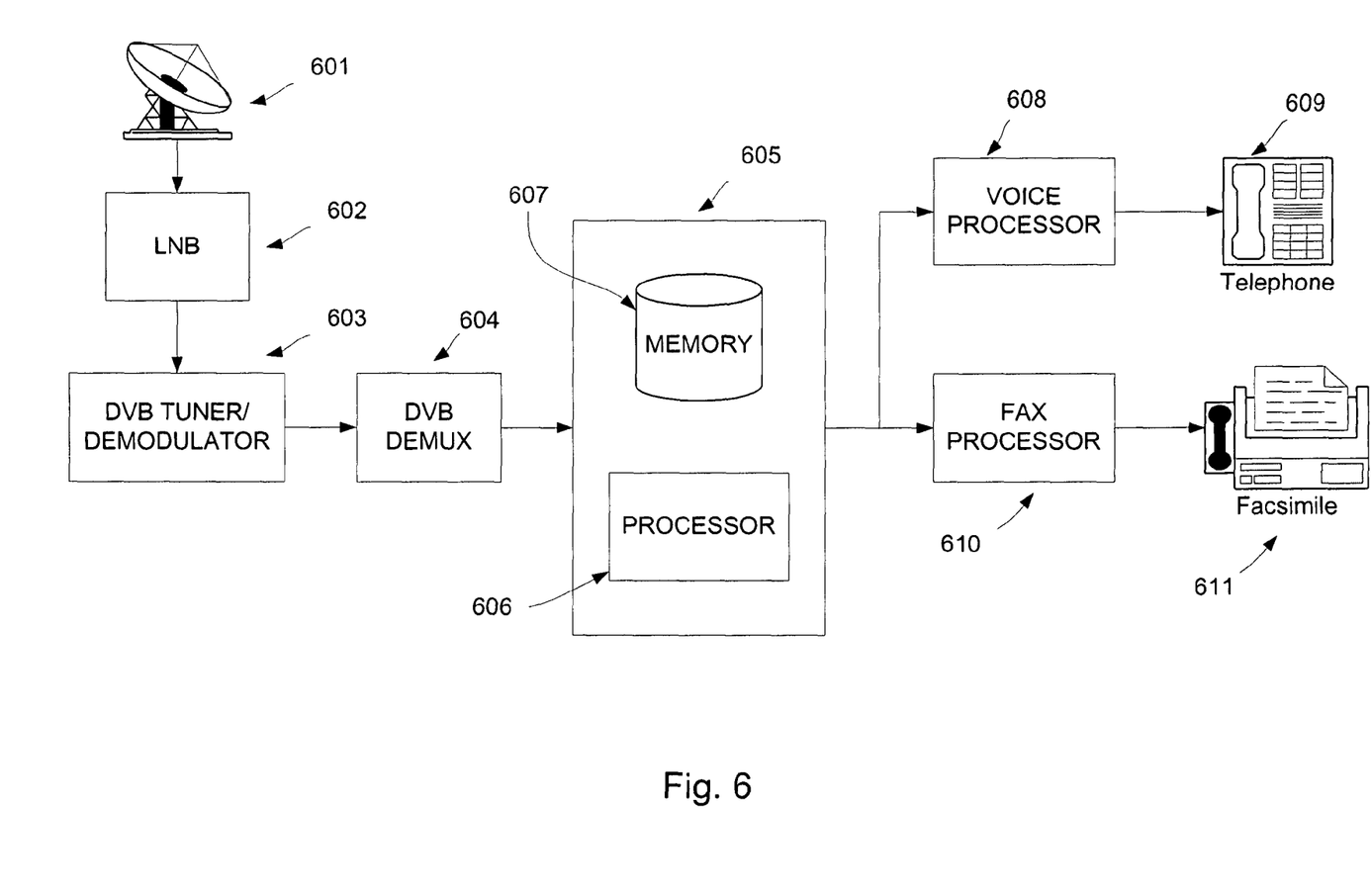
FIG. 6 illustrates an example block diagram of a system on which one or more embodiments of the present invention may be practiced.

FIG. 6 illustrates a basic block diagram of various components used in some embodiments, most of which are commercially-available. Satellite antenna 601 receives signals from a satellite (not shown), and forwards them to Low Noise Block-downconverter (LNB) 602, which may convert a block of received frequencies from a high band used for extraterrestrial transmission to a lower band for processing. From the LNB 602, received signals may be forwarded to a DVB Tuner/Demodulator 603, which may operate to process the received band of frequencies and isolate the data stream(s) received from the satellite. For example, DVB Tuner/Demodulator 603 may operate to separate the particular MPEG-2 datastream for processing. This stream of data may then be forwarded to a DVB Demultiplexer 604, which may determine whether a received packet's PID corresponds to one that the particular receiver should process. This may be done, for example, as shown above in step 504. DVB Demultiplexer 604 may also make a determination as to whether the particular frames of data contained in the packet are intended for a device connected to the receiver, such as a telephone. This determination may be based on the VSAT IDs contained within the packet, and may correspond to step 508 discussed above. The DVB Demultiplexor 604 may also determine whether the received packet includes any telephone data at all, as done in step 505 above.

DVB Demultiplexor 604 may forward packets containing one or more frames of telephone data to controller 605. Controller 605 may include one or more processors 606, executing code stored on one or more storage media 607, to perform the various steps described above and/or shown in FIG. 5. Controller 605 may then extract the particular frame(s) of telephone data from the packet, and forward the frame(s) to their proper destination based on the VSAT IDs, as is done in step 509 above. For example, frames of voice telephone data may be forwarded to one or more voice processors 608 for use with one or more telephones 609, or to one or more facsimile processors 610 for use with one or more facsimile machines 611. Processors 608 and 610 may perform the task of decoding/decompressing the frames of telephone data for use with their particular machine, and their functionality may be placed in separate processors (as shown), in a single processor, or integrated into either controller 605, telephone 609 or facsimile machine 611. Any other type of data-consuming device may also ultimately receive such data, and may also employ additional processing to convert the frames of data for their use.

Figure 7:
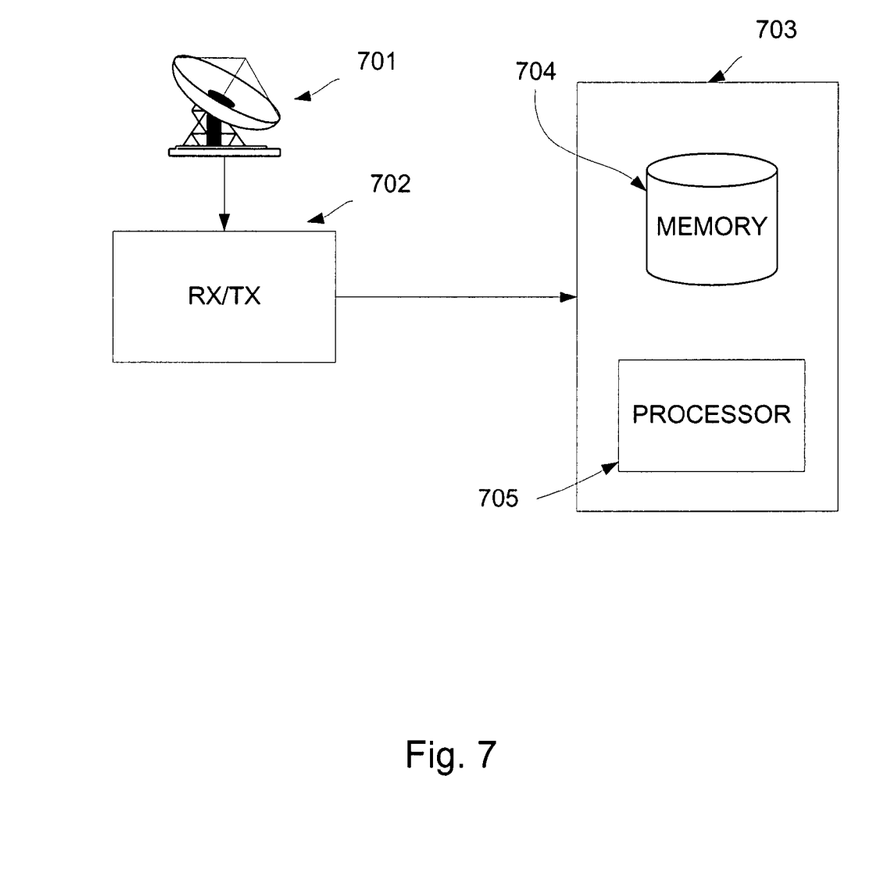
FIG. 7 shows an illustrative block diagram of components at a hub on which one or more embodiments of the present invention may be practiced.

FIG. 7 shows an illustrative block diagram of components that may be located at hub 102 to facilitate the transmission and reception of data sent to, and received from, the various terminals in the system. Hub 102 may include an antenna 701 which may be used to transmit data to and receive data from a satellite. In some embodiments, separate antennas may be used for transmission and reception. Hub 102 may also include transmission and/or reception circuitry 702, which may permit hub 102 to communicate with other terminals in the system via satellite. Hub 102 may include a controller 703 having one or more memories 704 and one or more processors 705. The one or more memories 704 may store executable instructions causing the one or more processors to receive, pack, and transmit data in the various formats described above.

Any of the aspects of the invention may be embodied in computer-executable instructions or code, such as in one or more program modules, executed by one or more computers, processors, or other devices located at or in communication with the terminals 103-106, satellite 101, and/or hub 102. Generally, program modules include routines, programs, objects, components, data structures, etc. that perform particular tasks or implement particular abstract data types when executed by a processor in a computer or other device. The computer executable instructions may be stored on a computer readable medium such as a hard disk, optical disk, removable storage media, solid state memory, RAM, etc., and may be stored in one or more such computer-readable media. As will be appreciated by one of skill in the art, the functionality of the program modules may be combined or distributed as desired in various embodiments. In addition, the functionality may be embodied in whole or in part in firmware or hardware equivalents such as integrated circuits, field programmable gate arrays (FPGA), and the like.

While the embodiments above have been described with respect to specific examples, those skilled in the art will appreciate that there are numerous variations and permutations of the above described systems and techniques. Thus, the spirit and scope of the invention should be construed broadly as set forth in the appended claims.

The invention claimed is:

1. A method of receiving telephone information, comprising the steps of:
   receiving a packet from a satellite at a receiver, said packet including a packet header and a payload;
   determining whether said received packet contains telephone data by reviewing a payload unit start bit in the packet header and a telephone code contained in the payload of said packet;
   based on a determination that the received packet contains telephone data, extracting a first frame of telephone data from said packet, wherein said packet does not contain data belonging to an Internet Protocol packet; and
   forwarding said first frame of telephone data to a first telephone device communicatively connected to said receiver.

2. The method of claim 1, further comprising the steps of:
   reviewing data contained in said packet to determine whether said packet contains telephone data intended for said receiver;
   extracting a second frame of telephone data from said packet; and
   forwarding said second frame of telephone data to a second telephone device communicatively connected to said receiver.

3. The method of claim 2, wherein said packet includes at least two VSAT identifiers.

4. The method of claim 2, wherein said packet includes a pointer to a location of said second frame, said location being within said packet.

5. The method of claim 1, further comprising the step of reviewing a frame counter contained within the payload of said packet to determine a number of frames of telephone data contained in said packet.

6. The method of claim 1, wherein said step of determining whether said received packet contains telephone data by reviewing the payload unit start bit in the packet header and the telephone code contained in the payload of said packet further comprises:
   reviewing said packet header to determine whether said payload unit start bit is set;
   if said payload unit start bit is set, reviewing a first byte of the payload of said packet to determine whether said first byte points to a location within said payload of said packet; and
   determining that said packet contains telephone data if said first byte does not point to a location within the payload of said packet.

7. A satellite receiver system, comprising:
   at least one processor; and
   at least one non-transitory computer-readable medium storing executable program code that, when executed by said at least one processor, causes said at least one processor to perform the following steps:
      receiving a packet from a satellite, said packet including a packet header and a payload;
      determining whether said received packet contains telephone data by reviewing a payload unit start bit in the packet header and a telephone code contained in the payload of said packet;
      based on a determination that the received packet contains telephone data, extracting a first frame of telephone data from said packet, wherein said packet does not contain data belonging to an Internet Protocol packet; and
      forwarding said first frame of telephone data to a first telephone device communicatively connected to said satellite receiver system.

8. The satellite receiver system of claim 7, the at least one computer-readable medium storing additional executable program code that, when executed by said at least one processor, causes said at least one processor to perform the following additional steps:
   reviewing data contained in said packet to determine whether said packet contains telephone data intended for said satellite receiver system;
   extracting a second frame of telephone data from said packet; and
   forwarding said second frame of telephone data to a second telephone device communicatively connected to said satellite receiver system.

9. The satellite receiver system of claim 8, wherein said packet includes at least two VSAT identifiers.

10. The satellite receiver system of claim 8, wherein said packet includes a pointer to a location of said second frame, said location being within said packet.

11. The satellite receiver system of claim 7, the at least one computer-readable medium storing additional executable program code that, when executed by said at least one processor, causes said at least one processor to perform the following additional step:

reviewing a frame counter contained within the payload of said packet to determine a number of frames of telephone data contained in said packet.

12. The satellite receiver system of claim 7, wherein said step of determining whether said received packet contains telephone data by reviewing the payload unit start bit in the packet header and the telephone code contained in the payload of said packet further comprises:

reviewing said packet header to determine whether said payload unit start bit is set;

if said payload unit start bit is set, reviewing a first byte of the payload of said packet to determine whether said first byte points to a location within said payload of said packet; and determining that said packet contains telephone data if said first byte does not point to a location within the payload of said packet.

13. A method of receiving telephone information, comprising the steps of:

receiving a packet from a satellite at a receiver, said packet having a packet header and a payload;

determining whether said payload contains telephone data of relevance to said receiver by identifying a pointer value in said packet payload, and determining whether said pointer value points to a location within said payload;

based on a determination that said payload contains telephone data of relevance to said receiver, extracting a plurality of frames of telephone data from said payload; and forwarding said frames of telephone data to at least one device communicatively connected to said receiver.

14. The method of claim 13, further comprising assigning a telephone data type to payload pointers that point to locations outside of the payload.

15. The method of claim 13, wherein the payload of said received packet contains at least three frames of compressed voice data.

16. The method of claim 14, wherein the payload of said received packet contains at least three VSAT IDs, each said VSAT ID identifying a device communicatively connected to said receiver.

17. The method of claim 14, wherein the payload of said received packet includes additional header information identifying a number of frames of compressed voice data contained in said payload.

18. The method of claim 13, further comprising:

extracting a packet identifier from the payload of said received packet; and determining whether said extracted packet identifier corresponds to a predefined packet identifier associated with the presence of telephone data in the received packet.

19. A communication method comprising the steps of:

packing a plurality of frames of telephone data into a payload portion of a single MPEG2 packet according to a DVB data piping profile and using a payload unit start bit in a header of said MPEG2 packet to indicate that the data in said payload is telephone data, wherein a first byte in the payload portion of the MPEG2 packet is a pointer that points to a location outside of the payload portion; and transmitting said MPEG2 packet to a receiver via an extraterrestrial satellite.

20. The method of claim 19, further comprising the step of determining a number of frames to pack in said MPEG2 packet based on an acceptable delay time.

21. The method of claim 19, further comprising the step of determining a number of frames to pack in said MPEG2 packet based on a size of said frames.

22. The method of claim 19, wherein said payload portion does not contain Internet Protocol data.

* * * * *